United States Patent
Imayama et al.

(10) Patent No.: US 7,076,219 B2
(45) Date of Patent: Jul. 11, 2006

(54) RECEIVER FOR WEAK RADIO WAVE

(75) Inventors: Teruo Imayama, Kanagawa-ken (JP); Tsuneo Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 380 days.

(21) Appl. No.: 10/445,248

(22) Filed: May 27, 2003

(65) Prior Publication Data

US 2004/0192241 A1   Sep. 30, 2004

(30) Foreign Application Priority Data

Mar. 24, 2003   (JP) ............................. P2003-081004

(51) Int. Cl.
    *H04B 1/16* (2006.01)
    *H04B 1/28* (2006.01)

(52) U.S. Cl. .................. 455/130; 455/214; 455/293; 455/333; 455/336

(58) Field of Classification Search ........ 455/204–210, 455/213, 214, 280, 295, 293, 334, 339, 341, 455/304, 313, 336–337, 333
See application file for complete search history.

(56) References Cited

U.S. PATENT DOCUMENTS

| 4,939,789 A | * | 7/1990 | Sakashita et al. ........... 455/260 |
| 5,737,035 A | * | 4/1998 | Rotzoll ........................ 348/725 |
| 5,930,695 A | * | 7/1999 | Yamaguchi et al. ......... 455/308 |
| 6,177,964 B1 | * | 1/2001 | Birleson et al. ............. 348/725 |
| 6,337,976 B1 | * | 1/2002 | Kudou ......................... 455/258 |
| 6,600,911 B1 | * | 7/2003 | Morishige et al. ........... 455/307 |
| 6,714,776 B1 | * | 3/2004 | Birleson ..................... 455/302 |

FOREIGN PATENT DOCUMENTS

| JP | 60-7209 | 1/1985 |
| JP | 61-5630 | 1/1986 |
| JP | 7-86856 | 3/1995 |
| JP | 8-70261 | 3/1996 |
| JP | 8-79125 | 3/1996 |
| JP | 2001-77716 | 3/2001 |

* cited by examiner

*Primary Examiner*—Simon Nguyen
(74) *Attorney, Agent, or Firm*—Oblon, Spivak, McClelland, Maier & Neustadt, P.C.

(57) ABSTRACT

An aspect of the present invention provides a receiving circuit that includes a mixer configured to receive a signal and a local signal to mix the signals, the mixer configured to convert the signals into an intermediate frequency signal, an IF filter configured to filter the intermediate frequency signal outputted from the mixer, an IF amplifier configured to amplify a band of the intermediate frequency signal outputted from the IF filter, and a demodulation circuit configured to receive a signal outputted from the IF amplifier to carry out demodulation, wherein a part of the demodulation circuit is disposed outside of the receiving circuit.

13 Claims, 10 Drawing Sheets

RECEIVER FOR WEAK RADIO WAVE

CROSS REFERENCE TO RELATED APPLICATIONS

This application claims benefit of priority under 35 USC 119 based on Japanese Patent Application No. P2003-081004 filed on Mar. 24, 2003, the entire contents of which are incorporated by reference herein.

BACKGROUND OF THE INVENTION

1. Field of the Invention

The present invention generally relates to a receiver, and more particularly, to a receiver for a weak radio wave.

2. Description of the Related Art

In receiving circuits used for a radio which receives a weak radio wave, such as a keyless entry system or simple data communications, a radio frequency (referred to as RF, hereinafter) is generally around 315 MHz or less. For example, when the RF is 315 MHz, an intermediate frequency (referred to as IF, hereinafter) of 455 kHz or 10.7 MHz is used in many cases. When the intermediate frequency is relatively high (i.e., 455 kHz or 10.7 MHz), desired characteristics have been realized by using and changing accessories such as a ceramic filter and a detection coil which are externally disposed from a semiconductor chip as an intermediate-frequency filter or a detection circuit.

However, there have been problems in that external accessories are large and expensive. The ceramic filter is used for the IF filter, and the detection coil is used for a phase shifting circuit of an FM detection circuit. There are ceramic filters with a narrow bandwidth (±5 kHz to ±15 kHz) for the IF frequency of 455 kHz and with a wide bandwidth (±50 kHz to 150 kHz) for the IF frequency of 10.7 MHz. Compared with a chip accessory, ceramic filters are much more expensive and the size thereof is also larger. The ceramic filter for the IF frequency 455 kHz is particularly large in size. While the height of the chip component is 1 mm or less, the height of a lead type ceramic filter is approximately 8 mm, and the height of a chip type ceramic filter is approximately 3 mm. In addition, the size of the detection coil is also large, and thus the conventional circuit has not been suitable for reducing costs and height.

On the other hand, when the intermediate frequency is as low as 100 kHz, the IF filter could be incorporated. In this case, an AGC (Automatic Gain Control) circuit may be connected to an output of the IF filter to detect an intermediate frequency signal and control the gain of an image rejection mixer so that an output signal of the IF filter is set to a predetermined level (refer to Japanese Patent Publication (Kokai) PH08-079125). Moreover, an adjustment circuit may be provided to set the center frequency of the IF filter equivalent to the intermediate frequency signal and the phase difference of the phase shifting circuit to 90° at the intermediate frequency (refer to Japanese Patent Publication (Kokai) PH08-070261). However, since it is difficult to change the bandwidth of the IF filter, which has band-pass filter characteristics, there has been a problem in that a semiconductor chip must be designed in accordance with its usage and performance, thus causing a lack of versatility.

SUMMARY OF THE INVENTION

An aspect of the present invention provides a receiving circuit that includes a mixer configured to receive a signal and a local signal to mix the signals, the mixer configured to convert the signals into an intermediate frequency signal, an IF filter configured to filter the intermediate frequency signal outputted from the mixer, an IF amplifier configured to amplify a band of the intermediate frequency signal outputted from the IF filter, and a demodulation circuit configured to receive a signal outputted from the IF amplifier to carry out demodulation, wherein a part of the demodulation circuit is disposed outside of the receiving circuit.

Another aspect of the present invention provides a receiver that includes an antenna configured to receive a radio signal, an RF filter configured to eliminate an image of the radio signal and an interference wave received from the antenna, the RF filter configured to output a signal of a specific frequency band, an RF amplifier configured to amplify a band of the frequency signal outputted from the RF filter, a mixer configured to receive the signal amplified by the RF amplifier and a local signal to mix the signals, the mixer configured to convert the signals into an intermediate frequency signal, an IF filter configured to filter the intermediate frequency signal outputted from the mixer, an IF amplifier configured to amplify a band of the intermediate frequency signal outputted from the IF filter, and a demodulation circuit configured to receive a signal outputted from the IF amplifier to carry out demodulation, wherein a part of the demodulation circuit is disposed outside of the receiving circuit.

DETAILED DESCRIPTION OF EMBODIMENTS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 1:
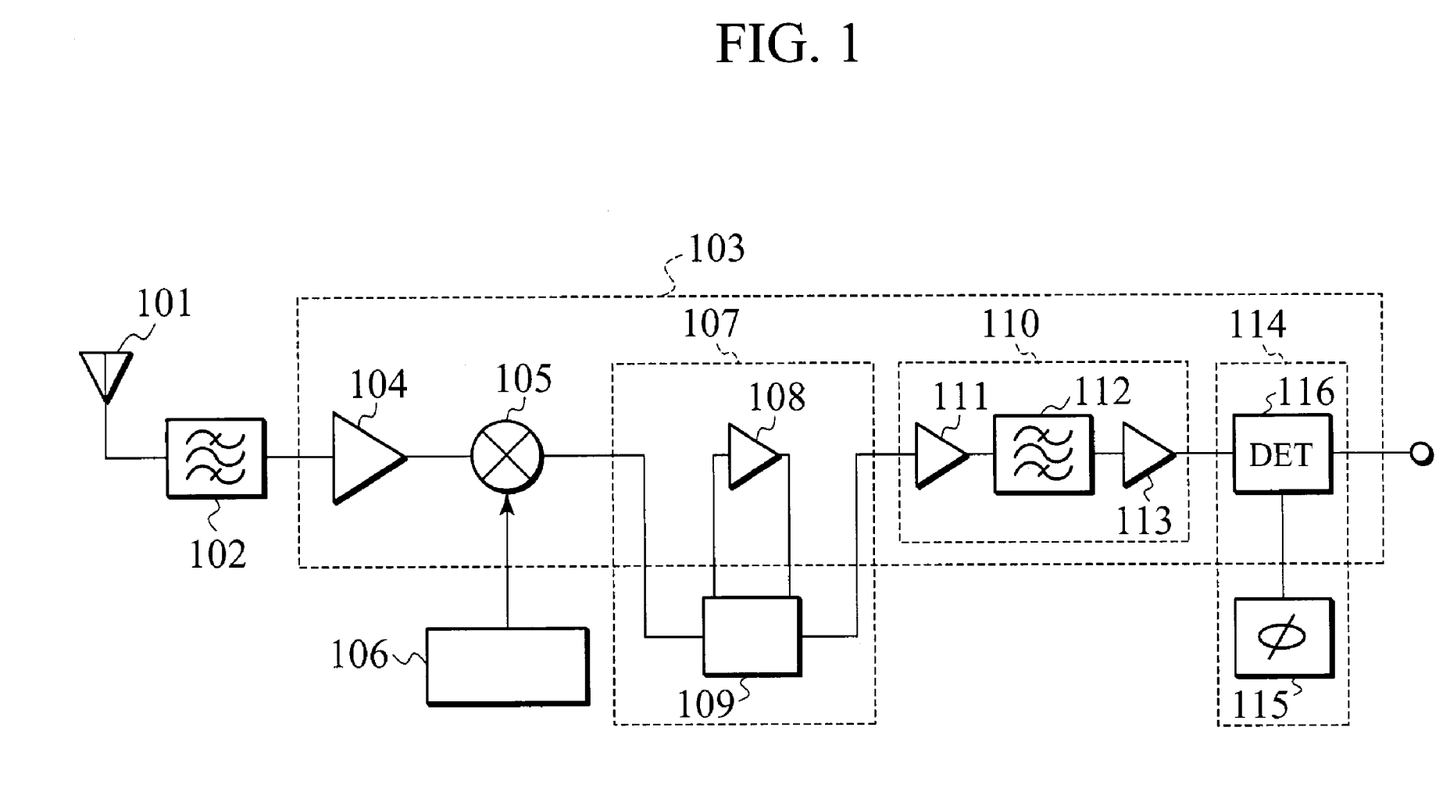
FIG. 1 is a view showing a receiver of a radio which receives a weak radio wave according to a first embodiment of the present invention.

FIG. 1 is a view showing a receiver for a radio which receives a weak radio wave according to a first embodiment of the present invention. This receiver comprises an antenna

101 that receives a radio signal from the outside, an RF filter 102 that eliminates an image of the radio signal and an interference wave received from the antenna 101 and outputs a signal of a specific frequency band, and a receiving circuit 103 that receives the radio signal, of which the image is eliminated by the RF filter 102, to carry out demodulation. The receiving circuit 103 comprises an RE amplifier 104 that amplifies a predetermined frequency band of a received signal, a mixer 105 that receives the signal amplified by the RE amplifier 104 and a local signal, and mixes these signals to convert them into an intermediate frequency signal, an IF filter 107 that filters the intermediate frequency signal outputted from the mixer 105, an IF amplifier 110 that amplifies a band of the intermediate frequency signal outputted from the IF filter 107, and a demodulation circuit 114 that receives a signal outputted from the IF amplifier 110 to carry out demodulation, and a part of which is disposed outside the receiving circuit 103. Herein, the receiving circuit 103 maybe realized by one semiconductor chip. Note that "outside" indicates that, for example, the described part is not manufactured integrally with the semiconductor chip but separately, when the receiving circuit is realized by one semiconductor chip, and subsequently connected to carry out its function.

The RF amplifier 104 receives the radio signal in which the image and interference wave have been eliminated by the RF filter 102, and amplifies a specific frequency band. The mixer 105 receives a signal outputted from the RF amplifier 104 and a local signal outputted from a local signal generator 106, which is not included in the receiving circuit 103. Thereafter, the mixer 105 mixes these received signals to convert them into an intermediate frequency signal. Herein, the mixer 105 includes an image rejection mixer or an image cancellation mixer for erasing a desired image signal of an intermediate frequency. In addition, the local signal generator 106 may include a crystal oscillator. The local signal generator 106 may or may not be included in the receiving circuit 103. In other words, the local signal generator 106 may be installed inside or outside the receiving circuit. Similarly, the local signal generation section 106 may or may not be included in the receiving circuit 103. The use of the image rejection mixer as the mixer 105 improves image interference characteristics, whereby a receiving circuit having good receiving sensitivity is realized.

Figure 2:
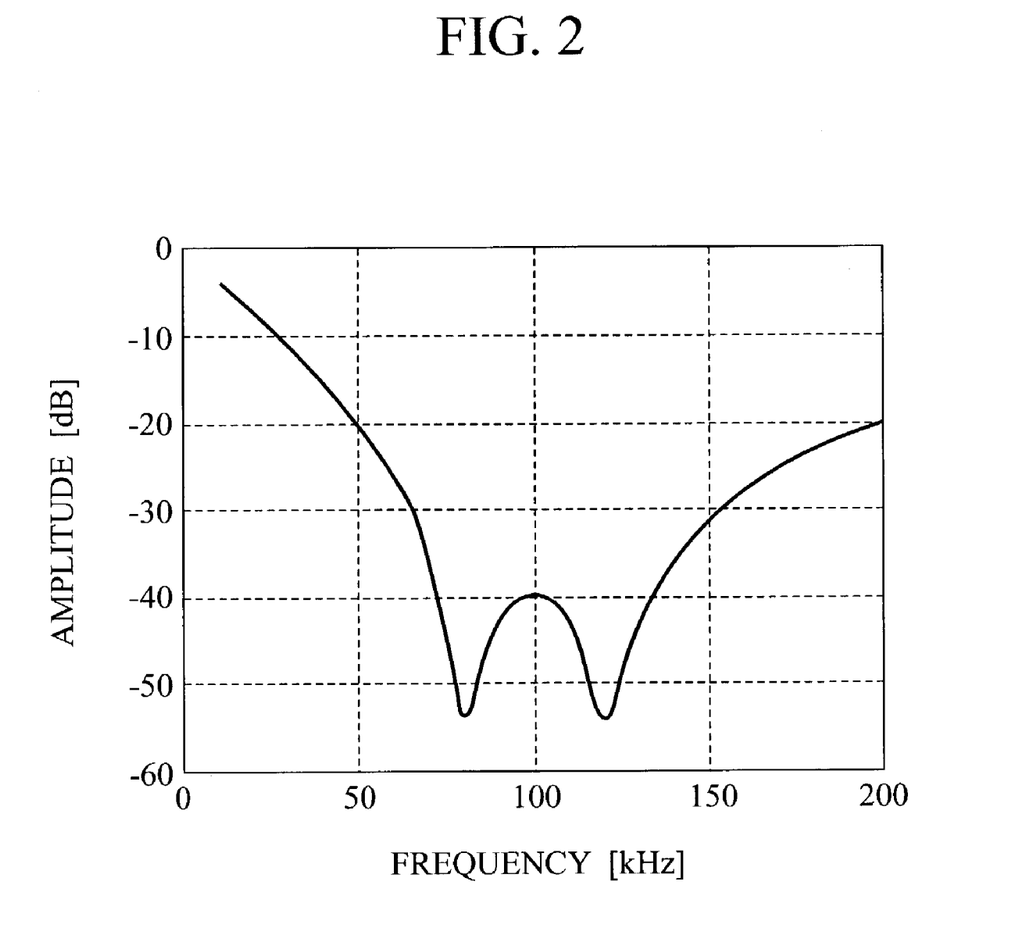
FIG. 2 is a chart showing image suppression characteristics of the image rejection mixer used as the mixer 105 according to the embodiment.

FIG. 2 is a chart showing image suppression characteristics of the image rejection mixer used as the mixer 105 according to the embodiment. A primary all-pass filter is used for an IF phase shifter. Assuming that an image signal suppression ratio is required to have a margin of −20 dB or higher, the frequency range used for the mixer is from 50 kHz to 200 kHz when an intermediate frequency is 100 kHz.

Next, the IF filter 107 is described. The IF filter 107 subjects the intermediate frequency signal outputted from the mixer 105 to further filtering so as to output a signal of a specific frequency band. According to the present embodiment, only a signal of a receiving channel is passed, and other signals are rejected. Herein, as shown in FIG. 1, the IF filter 107 of the present embodiment includes a buffer amplifier 108 disposed in the receiving circuit 103 and an external circuit 109 disposed outside the receiving circuit 103. However, the invention is not limited to this and can also be implemented by disposing the circuit 109 inside.

Figure 3:
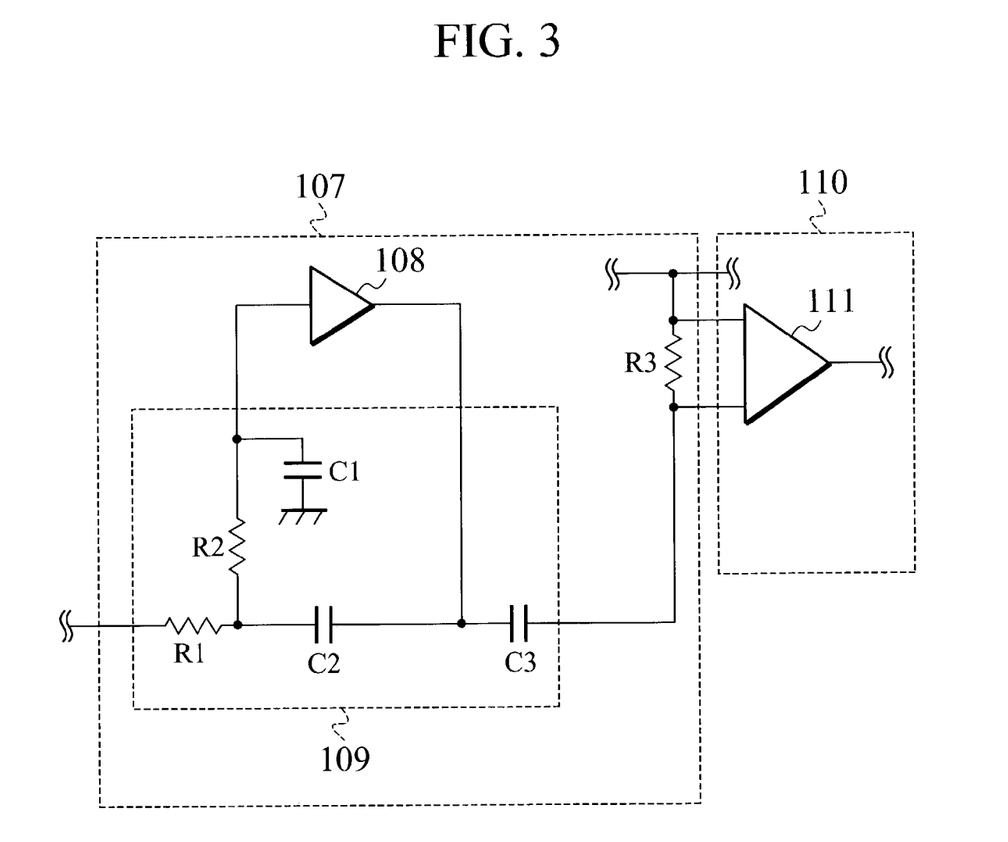
FIG. 3 is a diagram showing the IF filter 107 and the IF amplifier 110 of the embodiment and particularly illustrates circuitry of the external circuit 109 thereof.

FIG. 3 is a diagram showing the IF filter 107 and the IF amplifier 110 of the embodiment and particularly illustrates the circuitry of the external circuit 109 thereof. As shown, the external circuit 109 includes resistors R1 and R2, and capacitors C1, C2 and C3. In the receiver of the present embodiment, these resistors and capacitors are external components, in other words, disposed outside the receiving circuit 103. Note that "outside" indicates that, for example, the described part is not manufactured integrally with the semiconductor chip but separately, when the receiving circuit is realized by one semiconductor chip, and subsequently connected to carry out its function.

The IF filter 107 of the present embodiment includes a band pass filter having a secondary low-pass filter and a primary high-pass filter. Thus, for example, if frequency accuracy is required, the low-pass filter is externally disposed. Accordingly, a frequency band for filtering can be controlled by controlling the resistance value of a resistor and the capacity of a capacitor of the external circuit 109. In other words, by externally disposing the portion to be controlled, it is possible to change specifications without changing the design of the receiving circuit itself. Accordingly, a highly versatile receiving circuit can be realized without designing a receiving circuit for usage. Meanwhile, it is not necessary for a portion except for the external circuit (i.e., the buffer amplifier 108 of the embodiment) to be controlled. Thus, by including a component which needs no control in the receiving circuit, the external circuit can be miniaturized. Meanwhile, miniaturization of the entire receiving device can be achieved by reducing functions of external circuits. In addition, unlike the conventional art, it is not necessary to use any expensive ceramic filters, and thus costs can be reduced. Moreover, since the capacitor is disposed outside the semiconductor chip, the capacity value of the capacitor can be increased while the resistance value which is a noise source can be reduced. Thus, it is possible to improve the sensitivity of the IF filter.

Figure 4:
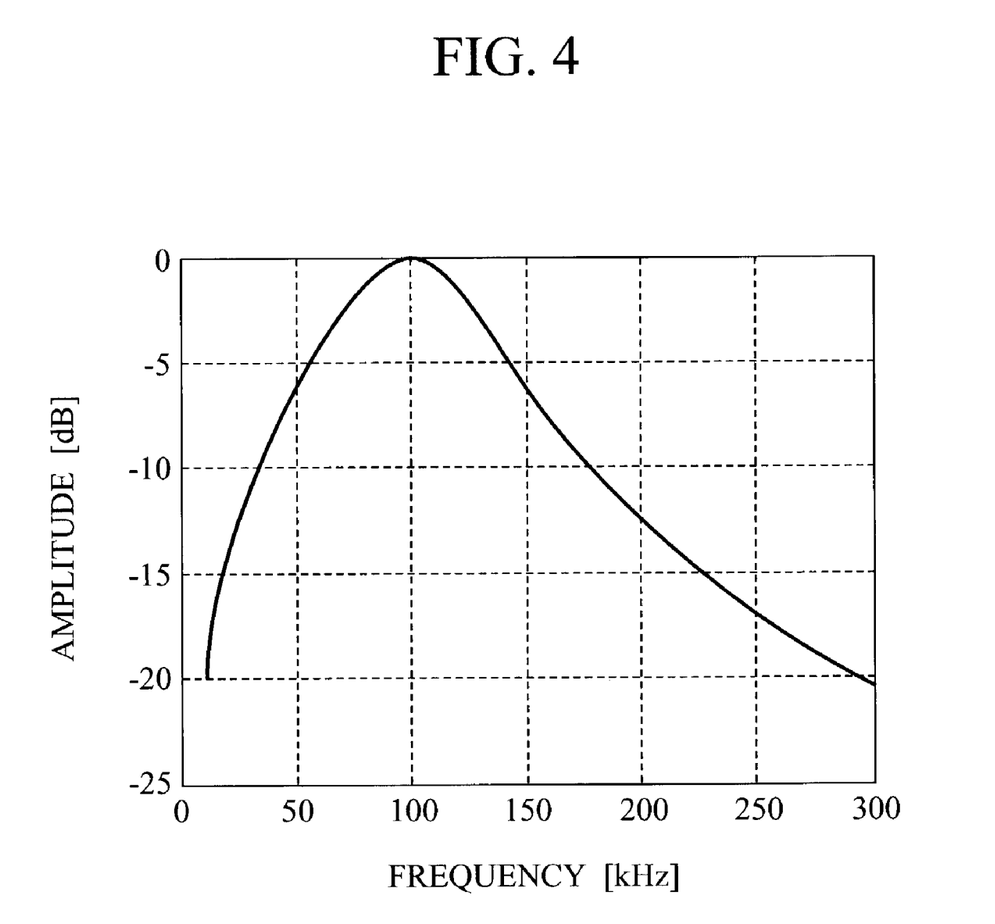
FIG. 4 is a chart showing a frequency characteristic example of the IF filter 107 shown in FIG. 3.

FIG. 4 is a chart showing a frequency characteristic example of the IF filter 107 shown in FIG. 3. An intermediate frequency and a bandwidth are preferably determined by considering the frequency accuracy of the IF filter. Herein, when frequency accuracy is required, the secondary low-pass filter uses an external resistor and an external capacitor since frequency accuracy is necessary. The primary high-pass filter uses a resistor incorporated in the semiconductor chip since-frequency accuracy is not so necessary. Assuming that the accuracies of the conventionally used external resistor and capacitor are ±2% and ±5%, respectively, the frequency accuracy of the secondary low-pass filter can be calculated to be ±7kHz if an intermediate frequency is 100 kHz. Thus, if frequency deviation of ¼ of a bandwidth can be permitted, the bandwidth may be set to ±30 kHz or higher. On the other hand, if the bandwidth is narrowed, the intermediate frequency may be reduced.

Next, the IF amplifier 110 is described. This IF amplifier 110 receives an output signal from the IF filter 107 and amplifies a signal of a specific frequency band to output. As shown in FIG. 1, the IF amplifier 110 of the present embodiment includes an IF amplifier 111, an IF filter 112, and an IF amplifier 113. In the embodiment, a plurality of IF amplifiers are used, but there is no particular limitation in this regard. By incorporating the IF filter 112 in the IF amplifier 111 and by using with the IF filter 107 as in the embodiment, it is possible to realize a receiving circuit with good interference characteristics.

Figure 5:
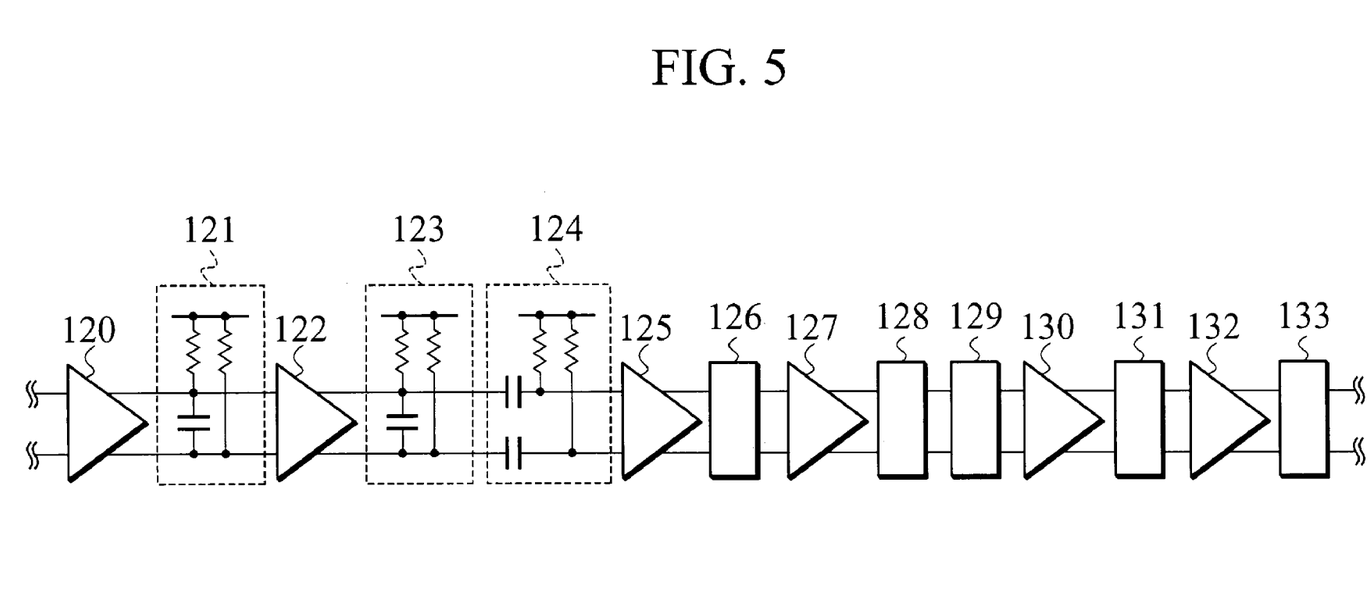
FIG. 5 is a circuit diagram of the IF amplifier 110 of the embodiment.

FIG. 5 is a circuit diagram of the IF amplifier 110 of the embodiment. This IF amplifier 110 includes amplifiers 120, 122, 125, 127, 130 and 132, low-pass filters 121, 123, 126, 128, 131, and 133, and high-pass filters 124 and 129. In this IF amplifier 110, the IF amplifier has a filter function to eliminate an interference wave farther than the receiving channel. According to the embodiment, the amplifier has a differential amplifier, and a low-pass filter and a high-pass filter constituted of resistors and capacitors which are put into an input/output of the differential amplifier, thereby constituting a band pass filter. More low-pass filters are disposed than high-pass filters in the IF amplifier 110 in order to eliminate more high frequencies than low frequencies. On the other hand, since the filter cut-off frequency is low and frequency accuracy is not necessary, the number of high-pass filters may be smaller than that of low-pass filters. In other words, preferably, the number of low-pass filters is greater than that of high-pass filters. In the embodiment, the ratio of the numbers of differential amplifiers, low-pass filters, and high-pass filters is set to 3:3:1, but the numbers are not limited to these.

Figure 6:
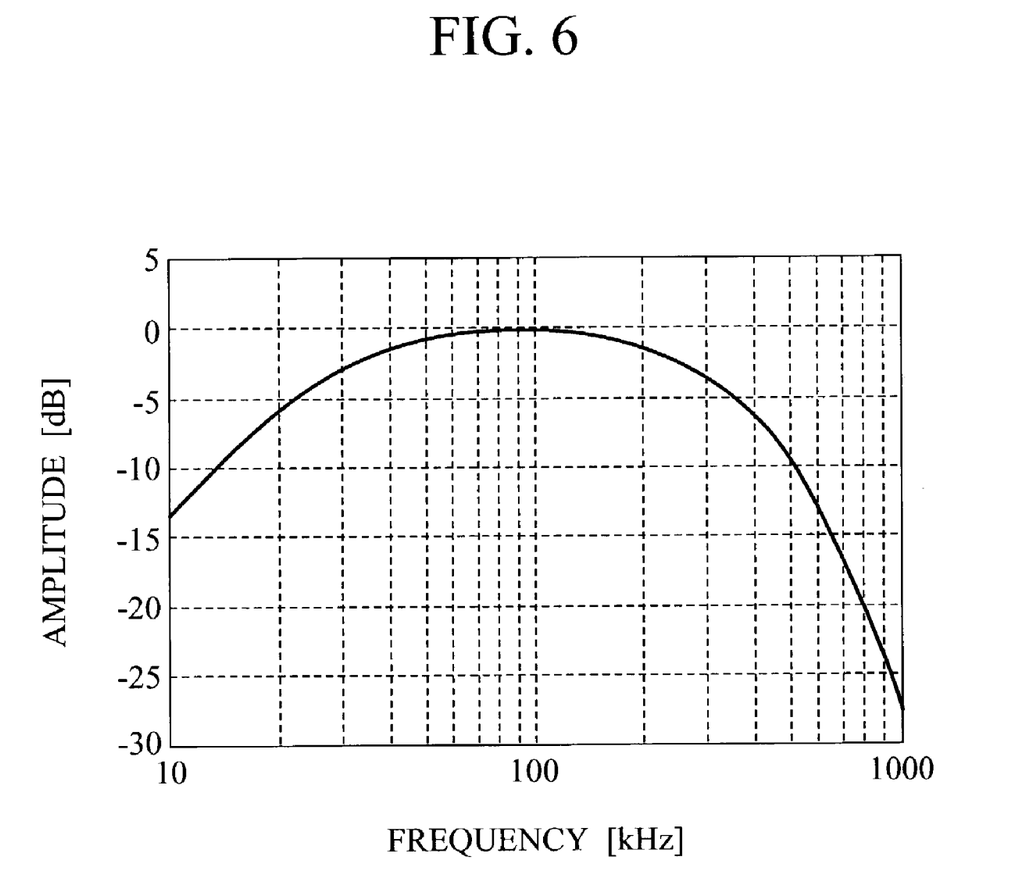
FIG. 6 is a chart showing frequency characteristics of the IF amplifier 110 shown in FIG. 5.

FIG. 6 is a chart showing the frequency characteristics of the IF amplifier 110 shown in FIG. 5. By constituting the IF amplifier 110 as shown in FIG. 5, roughly linear symmetric characteristics can be obtained with an intermediate frequency of 100 kHz.

Next, the demodulation circuit 114 is described. This demodulation circuit 114 receives a signal outputted from the IF amplifier 110 and outputs the signal after demodulation. Herein, the demodulation circuit 114 includes an FM detection circuit for converting a change in the frequency of an entered signal into a voltage, an AM detection circuit for converting a change in amplitude of the entered signal into a voltage, and an orthogonal detection circuit for converting a change in phase of the entered signal into a voltage. The demodulation circuit 114 of the embodiment includes a phase shifting circuit 115 and an FM detection circuit 116. By this FM detection circuit, a demodulation output is made into an audio signal or a data signal. The phase shifting circuit 115 of the embodiment is not included in the receiving circuit 103. However, it may also be disposed in the receiving circuit 103.

Figure 7:
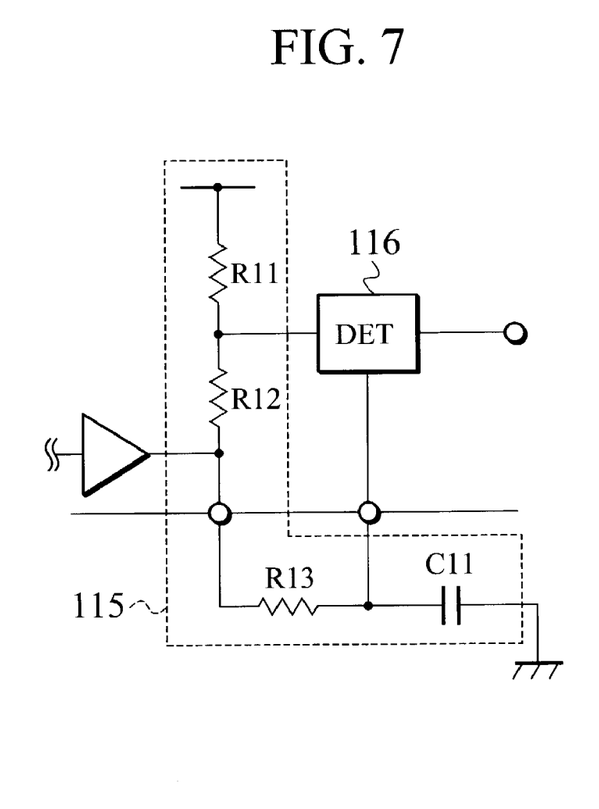
FIG. 7 shows the phase shifting circuit 115 of the FM detection circuit of the embodiment.
Figure 8:
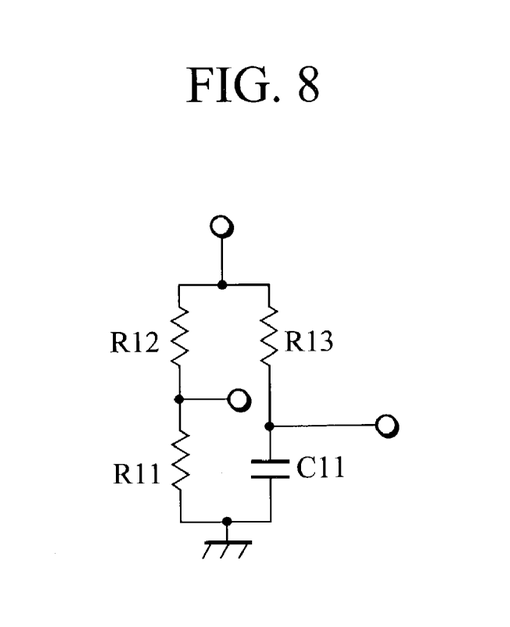
FIG. 8 shows an equivalent circuit of FIG. 7.

FIG. 7 shows the phase shifting circuit 115 of the FM detection circuit of the embodiment. This phase shifting circuit 115 constitutes a CR phase shifter and includes a resistor R13 and a capacitor C11. The resistor R13 and the capacitor C11 are disposed outside the receiving circuit. An all-pass filter (APF) is used for the phase shifting circuit 115 of the embodiment, and the values of two resistors R11 and R12 connected to the detection circuit are set so as to be equal, thereby a primary APF function can be provided. FIG. 8 shows an equivalent circuit of FIG. 7. By controlling the resistance value of the resistor and the capacity of the capacitor of the phase shifter 115, it is possible to control a frequency band for FM detection. In other words, by externally disposing a controllable portion, it is possible to change specifications without changing the design of the receiving circuit itself. Accordingly, a highly versatile receiving circuit can be realized without designing a receiving circuit for usage. On the other hand, a portion except for the phase shifting circuit (i.e., the FM detection circuit 116 in the embodiment) does not need to be controlled. Thus, the external circuit can be miniaturized by including the portion which needs no control in the receiving circuit. On the other hand, it is possible to miniaturize the entire receiver by reducing the functions of the external circuit.

Figure 9:
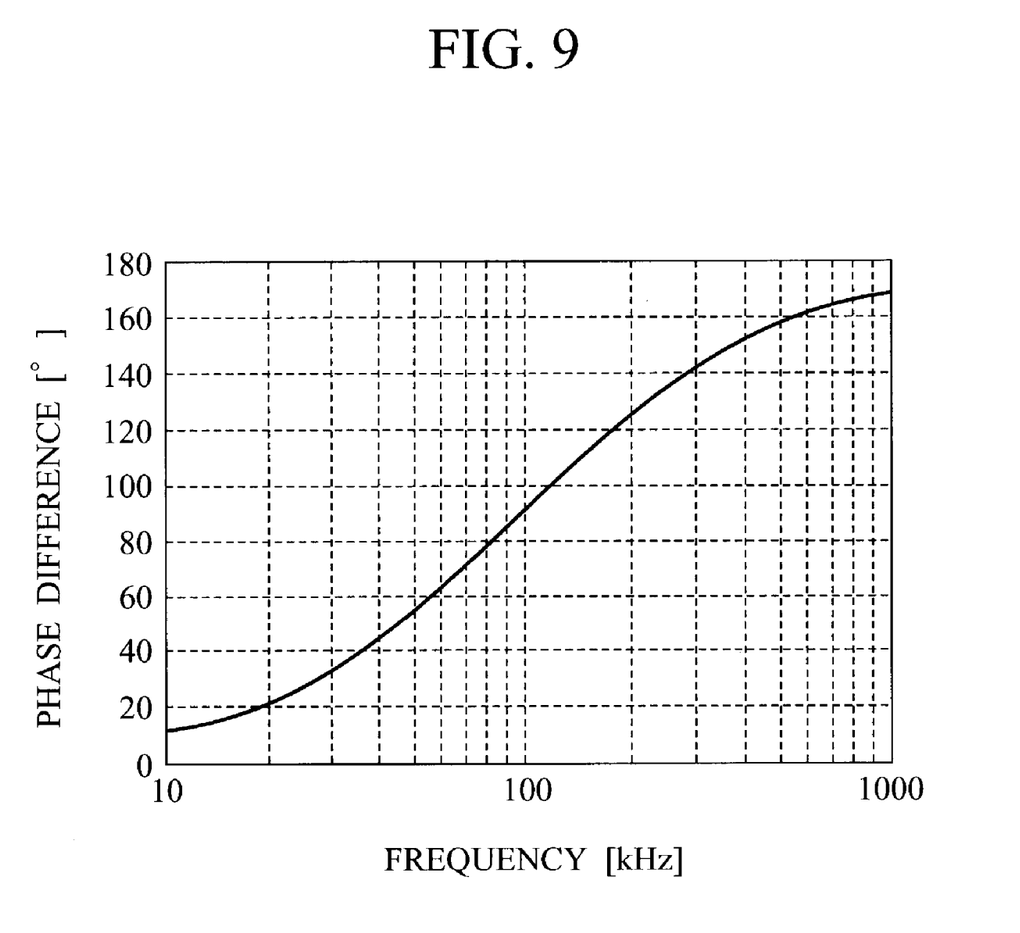
FIG. 9 is a chart showing characteristics of the phase shifting circuit 115 of the embodiment.

FIG. 9 is a chart showing characteristics of the phase shifting circuit 115 of the embodiment. In the phase shifting circuit 115 of the embodiment, adjustment can be made by changing a constant of the external resistor or the capacitor so that a phase can be set to 90° at an intermediate frequency.

A usable frequency range of the FM detection circuit 116 is an area where the phase characteristics of the phase shifter are linear and approximately 0.5 to 1.5 times larger than the intermediate frequency. If the intermediate frequency is 100 kHz, the usable frequency range of the FM detection circuit is from 50 kHz to 150 kHz.

Figure 10:
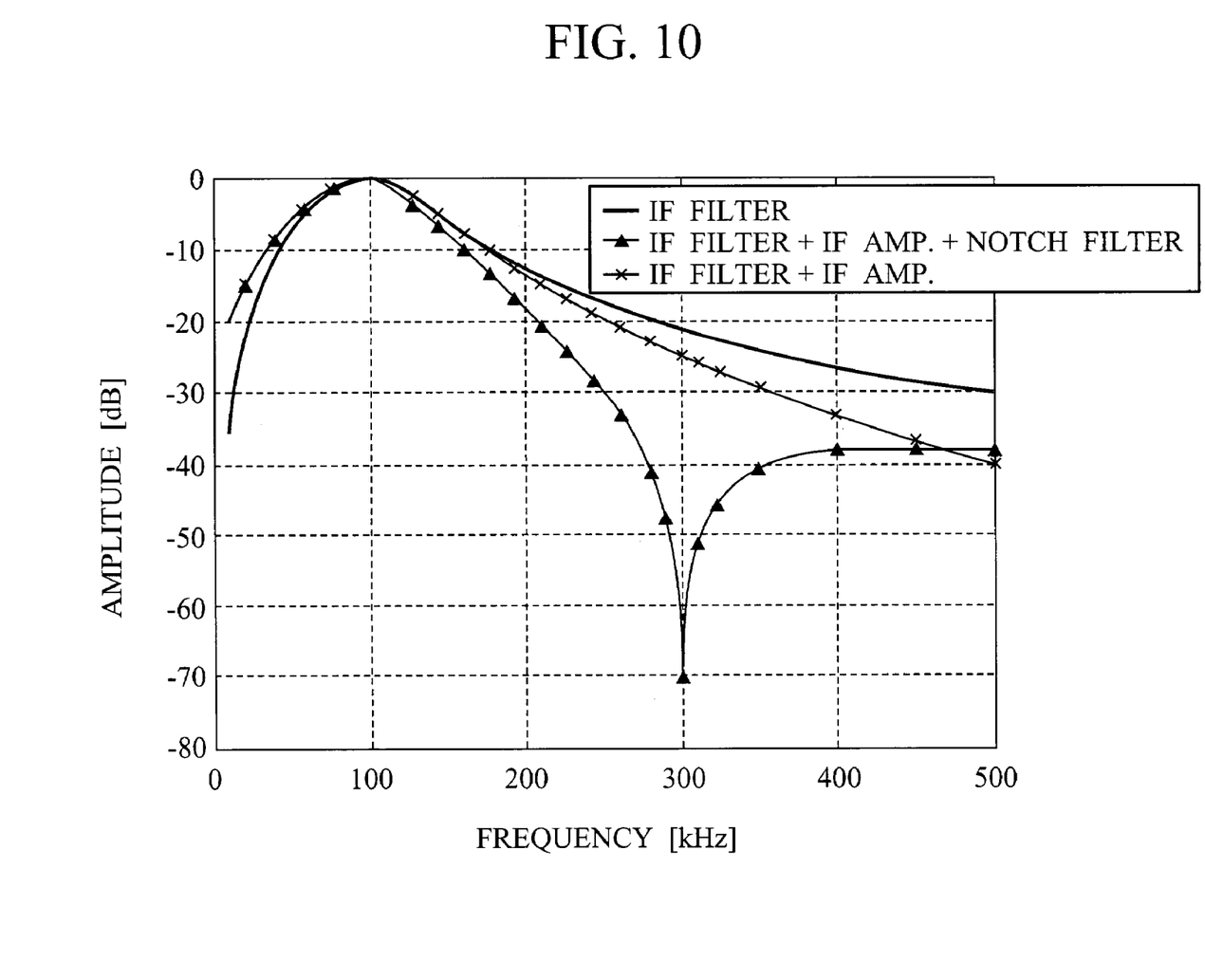
FIG. 10 is a chart showing frequency characteristics of the IF filter 107 and the IF amplifier 110 used in the embodiment.

FIG. 10 is a chart showing frequency characteristics of the IF filter 107 used in the embodiment, frequency characteristics of the IF filter 107 and the IF amplifier 110 having the filter function, and frequency characteristics of the IF amplifier 110 having the filter function to which a notch filter (referred to as band elimination filter (BEF), hereinafter) is superimposed on the frequency characteristics of the IF filter 107. Since not much attenuation is obtained at the high frequency band by using the IF filter 107 and the IF amplifier 110 having the filter function, it is advisable in practice to use a circuit where the BEF is inserted into the IF amplifier 110. The circuitry of the IF amplifier into which the BEF is inserted has the IF amplifier 111 and 113 which are set as IF amplifiers having filter functions and the IF filter 112 which is set as a BEF in a circuit as shown in FIG. 1. Preferably, an insertion position of the BEF is after passage through the differential amplifiers' one or two stages because the noise of the BEF disappears. However, this is not limited and the BEF can be inserted anywhere. As apparent from FIG. 10, high cut-off frequency is better in the case of characteristics with the BEF insertion.

In the receiving circuit of the embodiment, the IF filter and the phase shifting circuit of the FM detection circuit are constituted of external resistors and capacitors, and large and expensive components such as ceramic filters or detection coils which have conventionally been necessary become unnecessary. Thus, it is possible to realize a receiving circuit which can be reduced in terms of costs, height and size. Moreover, since it is possible to change characteristics of the IF filter and the phase shifting circuit by changing the constant of the external resistor or capacitor, it is not necessary to design a semiconductor chip for each usage, unlike conventional cases, and a highly versatile receiver can be realized.

Figure 11:
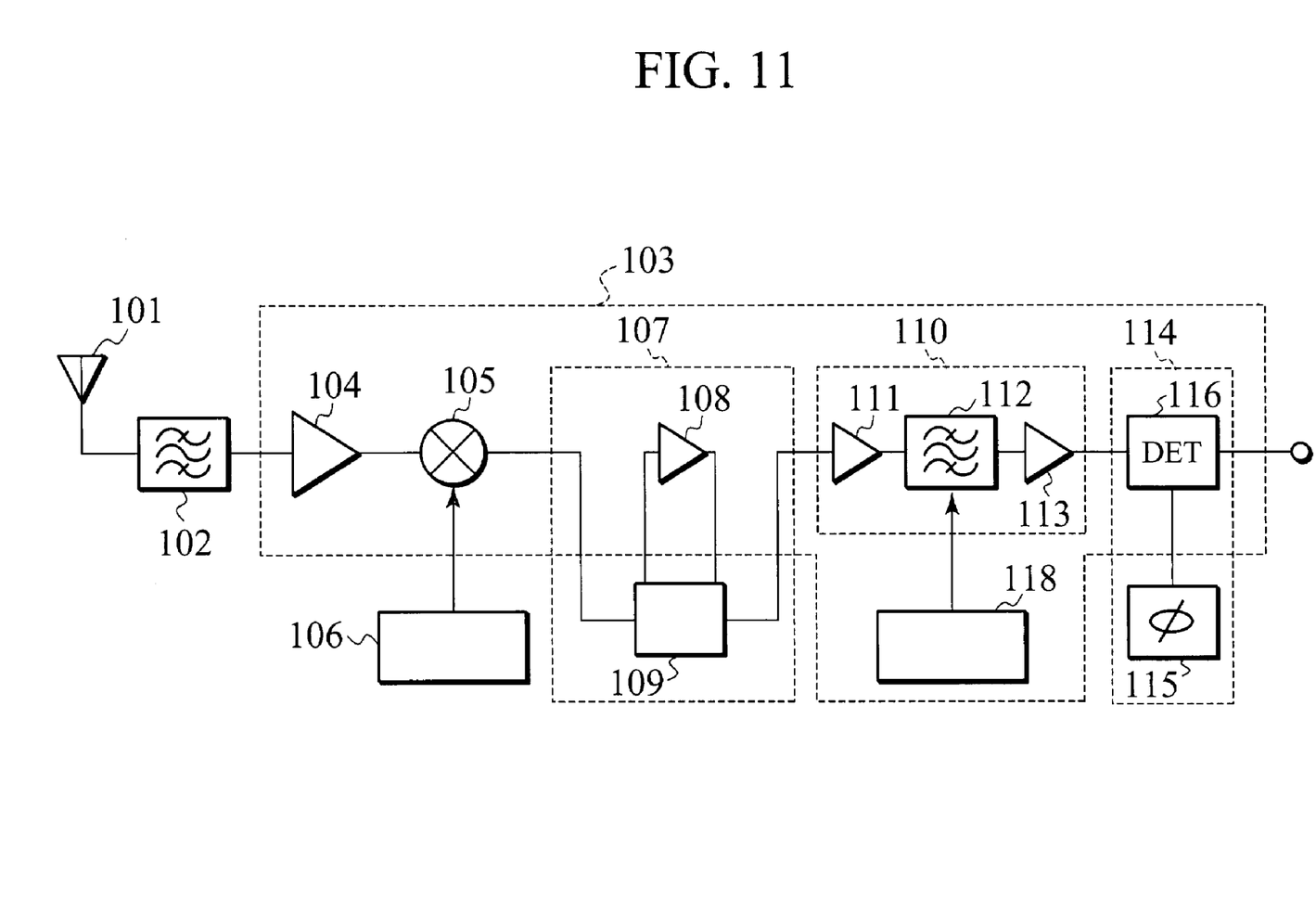
FIG. 11 is a diagram showing another embodiment of a receiver.

FIG. 11 is a diagram showing another embodiment of a receiver of the present invention. According to this embodiment, compared with the embodiment shown in FIG. 1, an adjustment circuit 118 is added. This adjustment circuit 118 sets a center frequency of an IF filter 112 equivalent to an intermediate frequency signal. In the embodiment of FIG. 11, an IF filter 107 is used in order to eliminate an interference wave far from the intermediate frequency signal, and the IF filter 112 is used in order to determine a bandwidth. A pulse count detection circuit is used for a demodulation circuit, and a resistor and a capacitor are used as external components of a semiconductor chip for pulse width adjustment. The advantages of the present embodiment can be also obtained by this method. Unlike a small power radio, the embodiment is particularly advantageous for a radio which receives a weak radio wave and has no strong adjacent interference waves and needs no sharp IF filter characteristics.

Therefore, in the receiving circuit and the receiver of the present invention, previously required large and expensive components such as ceramic filters and detection coils in a conventional circuit become unnecessary. Accordingly, costs and height can be reduced, and miniaturization can be achieved. Moreover, since the characteristics of the IF filter and the phase shifting circuit can be changed by changing the constant of the external resistor or capacitor, it is unnecessary to design a semiconductor chip for each usage unlike conventional cases, and it is possible to realize a highly versatile receiving circuit.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A receiving circuit comprising:
   a mixer configured to receive a signal and a local signal to mix the signals, the mixer configured to convert the signals into an intermediate frequency signal;
   an IF filter configured to filter the intermediate frequency signal outputted from the mixer;
   an IF amplifier configured to amplify a band of the intermediate frequency signal outputted from the IF filter; and
   a demodulation circuit configured to receive a signal outputted from the IF amplifier to carry out demodulation, the demodulation circuit comprising an FM detection circuit and a phase shifting circuit,
   wherein the mixer, the IF filter, and the FM detection circuit are realized in one semiconductor chip, and the phase shifting circuit is realized in another semiconductor chip, and
   wherein the demodulation circuit carries out demodulation based on a property of the phase shifting circuit.

2. The receiving circuit as claimed in claim 1, wherein the receiving circuit further comprises an RF amplifier configured to receive a signal to amplify and output the amplified signal to the mixer, the mixer configured to receive the signal outputted from the RF amplifier.

3. The receiving circuit as claimed in claim 1, wherein the phase shifting circuit is an all-pass filter.

4. The receiving circuit as claimed in claim 1, wherein the phase shifting circuit includes:
   a resistor disposed in the one semiconductor chip; and
   a capacitor disposed in the another semiconductor chip.

5. The receiving circuit as claimed in claim 1, wherein the IF filter includes:
   a buffer amplifier disposed in the one semiconductor chip;
   a resistor disposed in another semiconductor chip; and
   a capacitor disposed in another semiconductor chip.

6. The receiving circuit as claimed in claim 1, wherein the IF filter includes:
   a high-pass filter configured to filter a band of low frequency; and
   a low-pass filter configured to filter a band of high frequency.

7. The receiving circuit as claimed in claim 6, wherein the IF filter includes:
   a primary high-pass filter; and
   a secondary low-pass filter.

8. The receiving circuit as claimed in claim 1, wherein the IF includes:
   a high-pass filter configured to filter a band of low frequency;
   a low-pass filter configured to filter a band of high frequency; and
   an amplifier configured to amplify the intermediate frequency signal outputted from the IF filter.

9. The receiving circuit as claimed in claim 8, wherein the IF amplifier includes:
   at least one high-pass filter; and
   low-pass filters, the number of low-pass filters being more than that of high-pass filters.

10. The receiving circuit as claimed in claim 9, wherein the IF amplifier further comprises a notch filter.

11. The receiving circuit as claimed in claim 1, wherein the mixer is an image rejection filter.

12. A receiver comprising:
    an antenna configured to receive a radio signal;
    an RF filter configured to eliminate an image of the radio signal and an interference wave received from the antenna, the RF filter configured to output a signal of a specific frequency band;
    an RF amplifier configured to amplify a band of the frequency signal outputted from the RF filter;
    a mixer configured to receive the signal amplified by the RF amplifier and a local signal to mix the signals, the mixer configured to convert the signals into an intermediate frequency signal;
    an IF filter configured to filter the intermediate frequency signal outputted from the mixer;
    an IF amplifier configured to amplify a band of the intermediate frequency signal outputted from the IF filter; and
    a demodulation circuit configured to receive a signal outputted from the IF amplifier to carry out demodulation, the demodulation circuit comprising an FM detection circuit and a phase shifting circuit,
    wherein the mixer, the IF filter, and the FM detection circuit are realized in one semiconductor chip, and the phase shifting circuit is realized in another semiconductor chip, and
    wherein the demodulation circuit carries out demodulation based on a property of the phase shifting circuit.

13. The receiver as claimed in claim 12, wherein the phase shifting circuit is an all-pass filter.

* * * * *